US010589481B2

United States Patent
Gueugneau et al.

(10) Patent No.: US 10,589,481 B2
(45) Date of Patent: *Mar. 17, 2020

(54) MOULD ELEMENT COMPRISING A HIGH-CONTRAST TEXTURE

(71) Applicant: COMPAGNIE GENERALE DES ETABLISSEMENTS MICHELIN, Clermont-Ferrand (FR)

(72) Inventors: Anthony Gueugneau, Clermont-Ferrand (FR); Stéphane Montzieux, Clermont Ferrand (FR); Etienne Blanchet, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 183 days.

This patent is subject to a terminal disclaimer.

(21) Appl. No.: 15/322,532

(22) PCT Filed: Jun. 28, 2015

(86) PCT No.: PCT/IB2015/001069
§ 371 (c)(1),
(2) Date: Dec. 28, 2016

(87) PCT Pub. No.: WO2016/001733
PCT Pub. Date: Jan. 7, 2016

(65) Prior Publication Data
US 2018/0200974 A1    Jul. 19, 2018

(30) Foreign Application Priority Data

Jun. 30, 2014  (FR) ..................... 14 01466

(51) Int. Cl.
*B29D 30/06*    (2006.01)

(52) U.S. Cl.
CPC .. *B29D 30/0606* (2013.01); *B29D 2030/0612* (2013.01); *B29D 2030/0613* (2013.01); *B29D 2030/0616* (2013.01)

(58) Field of Classification Search
CPC ............ B29D 30/0606; B29D 30/0629; B29D 2030/0612; B29D 2030/0613; B29D 2030/0616
See application file for complete search history.

(56) References Cited

U.S. PATENT DOCUMENTS 3,082,480 A * 3/1963 Balle .................. B29D 30/0629
                                                              425/46
4,553,918 A   11/1985 Yoda
(Continued)

FOREIGN PATENT DOCUMENTS

DE          199 28 863       1/2001
DE      10 2007 005 455      8/2008
(Continued)

*Primary Examiner* — James P Mackey
(74) *Attorney, Agent, or Firm* — Cozen O'Conner

(57) ABSTRACT

A mould element (18) intended to be attached in a mould (10) for vulcanizing tires, the mould element (18) having the form of a skin with a thickness (E) comprised between 0.25 and 6 mm and comprising a bearing surface (20) with, on the opposite side, a moulding surface (22) intended to form all or part of the external surface of the tire. The mould element comprises a pattern (30) comprising a plurality of recessed (19, 21, 112) or protruding (106, 107) elements, formed as integral parts of the mould element (18).

10 Claims, 3 Drawing Sheets

(56) References Cited

U.S. PATENT DOCUMENTS

| | | | |
|---|---|---|---|
| 4,598,747 A | 7/1986 | Fletchner | |
| 6,196,818 B1 | 3/2001 | Coleman | |
| 7,225,844 B2 * | 6/2007 | Lagnier | B29D 30/0606 |
| | | | 152/209.21 |
| 9,196,818 B2 | 11/2015 | Yamane | |
| 9,346,230 B2 * | 5/2016 | Calvel | B29D 30/0629 |
| 9,352,522 B2 * | 5/2016 | Gueugneau | B29D 30/0629 |
| 9,463,604 B2 * | 10/2016 | Gueugneau | B29D 30/0606 |
| 2002/0139164 A1 * | 10/2002 | Ishihara | B21D 37/20 |
| | | | 72/326 |
| 2005/0109438 A1 | 5/2005 | Collette | |
| 2007/0095447 A1 | 5/2007 | Nguyen | |
| 2008/0283169 A1 | 11/2008 | Sato | |
| 2009/0159167 A1 | 6/2009 | Scheuren | |
| 2011/0318532 A1 * | 12/2011 | Dusseaux | B29D 30/0629 |
| | | | 428/141 |
| 2012/0055601 A1 | 3/2012 | Christenbury | |
| 2012/0161348 A1 | 6/2012 | Jenkins | |
| 2012/0227879 A1 | 9/2012 | Muhlhoff | |
| 2013/0118660 A1 | 5/2013 | Gay | |
| 2015/0251367 A1 | 9/2015 | Cocural | |

FOREIGN PATENT DOCUMENTS

| | | |
|---|---|---|
| EP | 1 063 071 | 12/2000 |
| FR | 2 939 714 | 6/2010 |
| GB | 588170 | 5/1947 |
| JP | 11-179730 | 7/1999 |
| WO | WO 2007/045425 | 4/2007 |
| WO | WO 2009/007790 | 1/2009 |
| WO | WO 2010/076502 | 7/2010 |
| WO | WO 2012/171802 | 12/2012 |
| WO | WO 2014/040967 | 3/2014 |
| WO | WO 2014/060209 | 4/2014 |

* cited by examiner

MOULD ELEMENT COMPRISING A HIGH-CONTRAST TEXTURE

RELATED APPLICATIONS

This is a U.S. National Phase Application under 35 USC 371 of International Application PCT/IB2015/001069 filed on May 28, 2015.

This application claims the priority of French application Ser. No. 14/01466 filed Jun. 30, 2014, the entire content of which is hereby incorporated by reference.

FIELD OF THE INVENTION

The present invention relates to a mould element for a tire comprising a bearing surface and, on the opposite side, a moulding surface intended to form the external surface of the said tire.

BACKGROUND OF THE INVENTION

The surface of tires supports a large quantity of markings intended on the one hand to provide technical information as to the quality of the tire, and on the other hand to allow the consumer to discern the make and origin of the product. As a general rule, these markings are obtained by raised patterns arranged on the surface of the tire and corresponding to recessed patterns made on the moulding surface. Vulcanizing moulds are usually made of metal with a very good surface-finish but the resulting, smooth and black external surface of the tire has the effect of reflecting light.

Document WO2007/045425 describes particular types of high-contrast texture on tires. These textures have the main effect of trapping incident light and, by absorbing light, of giving part of the tire a black and matt appearance. This absorption of light makes it possible to obtain a more intense black colour that forms a better contrast with the rest of the surface of the tire. The contrast is all the greater when the texture sits alongside bright surfaces on the tire.

The contrast obtained by this absorption of light produces an appreciable visual effect on the finish of the product, often likened to the visual appearance of velours. Now, obtaining textures that produce such an effect is still at the present time a technological challenge that has been resolved only in part. Specifically, the current methods are relatively expensive and tricky to implement, and only allow the production of certain types of pattern, at certain locations, generally those that are easy to access.

Patent application WO 2010/076502 proposes a lining assembly for a tire mould comprising a skin. The skin is delimited by a first and a second surface that are opposite surfaces, the first surface being intended to be in contact with a tire mould support block and a plurality of lining elements projecting from the second surface of the skin, these elements being intended to form tread patterns in part of a radially external surface of a tire. Such an assembly makes it possible to obtain conventional tread patterns such as those of the treads of conventional tires.

Application WO2014060209 describes a moulding element for a tire mould manufactured from a metallic powder which is melted layer by layer. This moulding element comprises a first surface intended to mould all or part of a tire tread surface, and a second surface, on the opposite side to the first surface, and intended to be in contact with another part of the mould. The thickness of the moulding element is comprised between 1 and 6 millimetres. The moulding element has an overall density greater than or equal to 98%.

The moulding element further comprises at least a first porous region extending into the thickness of the said mould element. The first porous region comprises a plurality of pores allowing air to pass between the first surface of the moulding element and the second surface thereof.

There is at the present time a need for solutions that make it possible to produce tires provided with intense black textures with great flexibility and advantageous costs.

In order to alleviate these various disadvantages, the invention provides various technical means.

SUMMARY OF THE INVENTION

One object of the invention is to provide a moulding system or mould element that allows for use over a wide variety of tires and makes it possible to produce various types of pattern or texture.

Another object of the invention is to provide a moulding system or mould element that can be obtained at competitive cost and in competitive production lead time.

Yet another object of the invention is to provide a moulding system or mould element that makes available patterns with no restriction on position in the mould, making it possible to obtain on the tire particular textures on the surface of the tread, for example a velours-type texture, or a particular graphic marking.

Yet another object of the invention is to provide a moulding system or mould element that allows the configuration of a mould to be modified quickly and easily in order to produce a tire with one or more different textures.

In order to achieve this, one aspect of the invention is directed to a mould element intended to be attached in a mould for vulcanizing tires, the mould element having the form of a skin with a thickness comprised between 0.25 and 6 mm, the skin comprising a bearing surface and, on the opposite side, a moulding surface intended to form all or part of the external surface of the said tire, the mould element comprising a pattern comprising a plurality of recessed or protruding elements formed as integral parts of the said mould element, the said pattern comprising an organised arrangement of a plurality of elements (such as striations, holes, strands, strips), all or some of these elements being the repeat of one and the same basic element, the pattern present on the mould making it possible to obtain a particular texture on a tire vulcanized using the said mould.

Such a mould element provided with these features has the notable advantage that it can be manufactured in hidden time, without requiring laser machining operations subsequent to those required for shaping the element itself, since the set is generated from operations of the same kind, from the start to the end of manufacture of the component. No machining operation carried out on the finished component weakens or sullies it.

Advantageously, in one embodiment the plurality of elements of the organised arrangement that constitutes the pattern are configured, arranged and dimensioned in such a way as to create, on the tire that is to be moulded, textures the light absorption ratio of which is substantially higher than in the non-textured regions. The textures obtained on the moulded tires give the textured part a black and matt appearance, forming a contrast in terms of the black-level intensity against the non-textured surfaces of the tire.

According to an advantageous embodiment, the depth of the recessed elements is less than or equal to 30% of the thickness of the mould element or the height of the protrusions is less than or equal to 30% of the thickness of the mould element, and, more preferably, the depth of the recessed elements is less than or equal to 15% of the thickness of the mould element or the height of the protrusions is less than or equal to 15% of the thickness of the mould element.

The addition of protrusions allows the skin to be stiffened. The recessed elements do not weaken this skin because their relative thickness is very small.

Advantageously, the pattern is arranged on a bar or a sipe blade of the mould element. Such an architecture allows the texture of the tire to be moulded in a groove (which corresponds to the bar skin) or a sipe (which corresponds to a sipe blade of the skin) and affords an additional aesthetic appearance, for example the illusion of depth.

Several alternative embodiments are envisaged for the patterns. According to one alternative form, all or part of the pattern is formed by conical recesses distributed through the pattern with a density at least equal to one conical recess per square millimetre (mm$^2$), each conical recess having a mean cross section comprised between 0.0005 mm$^2$ and 1 mm$^2$.

According to another alternative form, all or part of the pattern are substantially mutually parallel striations, the spacing of the striations in the pattern being at most equal to 0.5 mm, each striation having a mean width comprised between 0.02 mm and 0.5 mm.

According to yet another alternative form, all or part of the pattern forms recessed forms of parallelepipeds of side length (C) comprised between 0.05 mm and 0.5 mm, of height (Hp) comprised between 0.05 mm and 0.5 mm, the distance between two adjacent parallelepipeds in the texture being comprised between 0.05 mm and 0.5 mm.

According to another advantageous form of embodiment, the parallelepipeds have mutually variable shapes and distances between them.

According to yet another advantageous embodiment, the protruding elements form strands, the said strands being distributed through the pattern with a density at least equal to one strand per square millimetre (mm$^2$), each strand having a mean cross section S comprised between 0.0005 mm$^2$ and 1 mm$^2$.

The mould element according to the invention may be configured for moulding a tire sidewall region or alternatively for moulding a tire tread region.

Advantageously, the mould element is produced by laser sintering.

Another aspect of the invention is directed to a segmented mould for vulcanizing tires, each segment comprising a solid support block provided with a support surface and a set of linings attached to the support block, the set of linings comprising at least one mould element as described hereinabove, arranged against a support surface of a support block.

BRIEF DESCRIPTION OF THE DRAWINGS

All the embodiment details are given in the description which follows which is supplemented by FIGS. 1 to 8, given solely by way of non-limiting examples and in which.

DETAILED DESCRIPTION OF THE DRAWINGS

A "pattern" on a mould means an organized arrangement of a plurality of elements (striations, holes, strands, strips), all or some of these elements being a repeat of one and the same basic element, the pattern present on the mould making it possible to obtain a particular texture on a tire.

In the description which will follow, elements that are substantially identical or similar will be denoted by identical references.

Figure 1A:
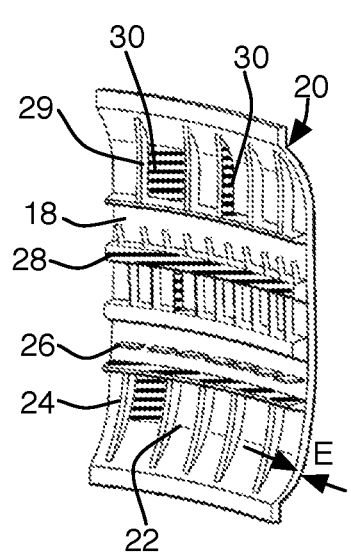
FIG. 1a is a perspective view of a first example of a mould element comprising a pattern according to the invention.

FIG. 1 illustrates a portion of a segmented mould 10 for vulcanizing tires. This mould 10 comprises a body 12 advantageously made of aluminium alloy and notably comprising a plurality of support surfaces 16 intended to accept a plurality of inserts 18. Each insert adopts the form of a thin skin, on which are arranged networks of tire tread pattern elements 24. Included among the tread pattern elements 24 there are notably sipe blades 26 which are intended to form circumferential slits in the tread of the tire or circumferential bars 28 which are intended to form a longitudinal groove in the tread of the tire. The various bars 28 may be connected by axial sipe blades 29 to form the network of tread pattern elements 24.

Each of the inserts 18 comprises a first 20 and a second 22 surface which are opposite surfaces, the first surface 20 being intended to be in contact with the support surface 16 of the mould. The inserts are specifically designed to allow patterns 30 used to produce textures on the tires and which will be moulded with the mould to be incorporated into the body 12. For that, at least some of the inserts 18 comprise a pattern 30 which comprises a plurality of recessed or protruding elements, the said pattern being formed as an integral part of the inserts. In other words, each insert 18 including the patterns 30 is produced as a single piece. The thickness of each insert 18 is comprised between 0.25 and 6 millimetres or even more.

In order to produce such an insert 18, the procedure advantageously involves selective laser sintering of a metallic powder. During manufacture of the insert, care is taken to ensure that the shape of the first surface 20 is the complement of the shape of the support surface 16 of the body 12 so that the insert 18 can engage correctly with the body.

Figure 1B:
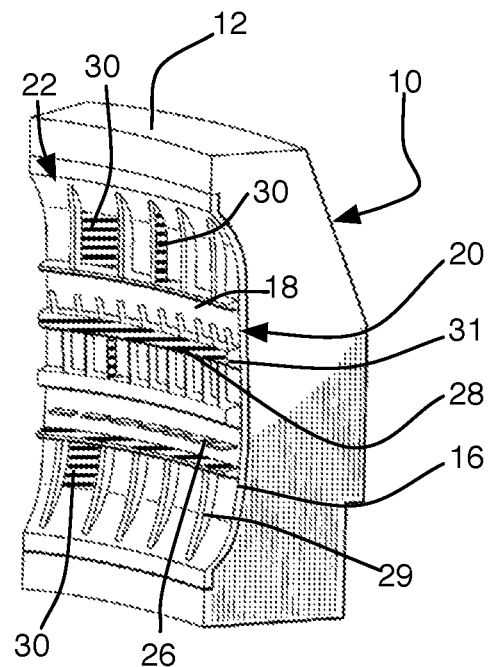
FIG. 1b is a perspective view of the mould element of FIG. 1a placed on a support block.

The mould element 18 comprises one or several patterns 30. According to the exemplary embodiments, the patterns 30 are provided between the bars and sipe blades, and/or on portions of bars and/or on portions of sipe blades. In the example of FIG. 1b, patterns 30 defining profiles of substantially square shapes are provided between certain sipe blades. Depending on the desired appearance, a near-infinite number of pattern shapes or profiles may be provided. A longitudinal pattern is moreover provided along a bar 31. This example also includes textures on the flanks of the sipe blades 29. The patterns 30 are also formed as an integral part of the mould element. The mould elements, including the patterns 30, are advantageously produced by laser sintering, this method of manufacture affording the advantage of making it possible to create very fine and/or highly complex patterns, as described hereinafter.

Figure 2A:
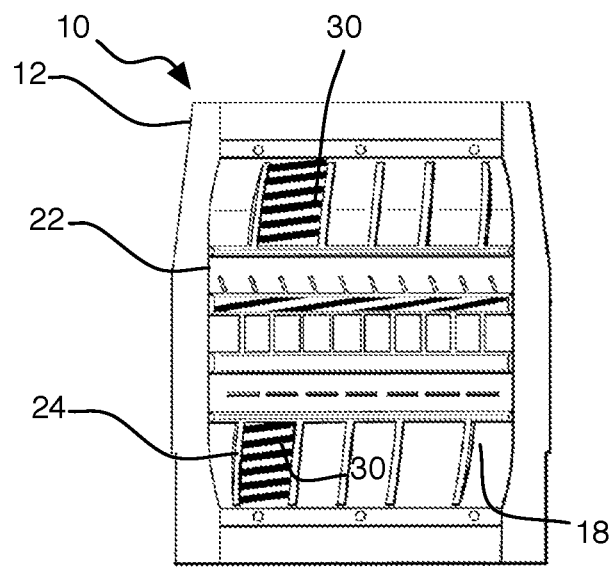
FIG. 2a is a front view of a second exemplary embodiment of the mould element with support block according to the invention.
Figure 2B:
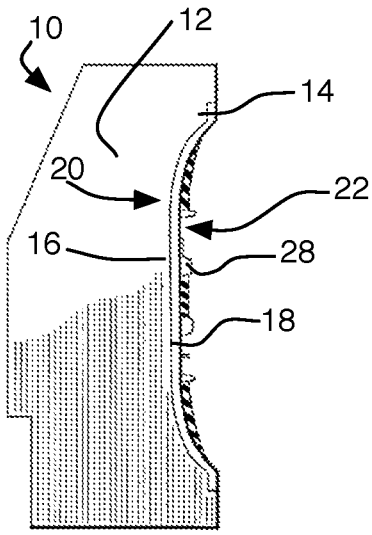
FIG. 2b is a side view of the mould element of FIG. 2a placed on a support block.

FIG. 2a illustrates another exemplary embodiment in which patterns 30 are provided between each of the sipe blades 24.

Figure 3:
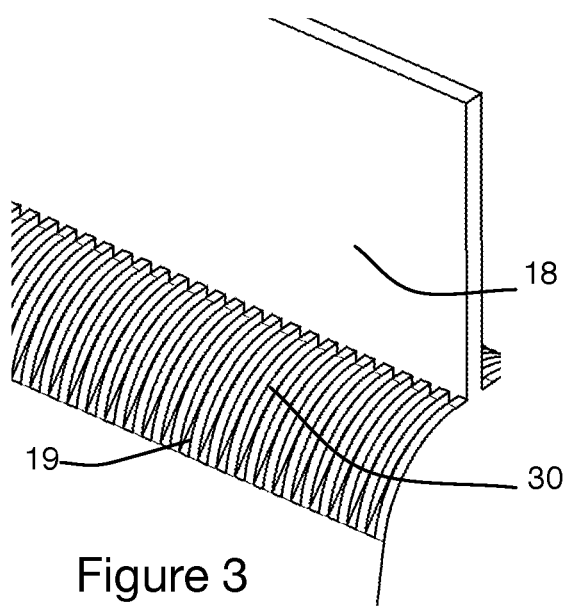
FIG. 3 shows a mould element comprising a pattern formed of striations recessed into the mould.
Figure 4:
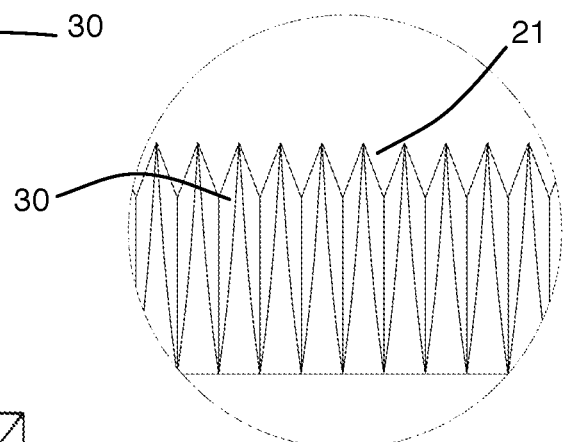
FIG. 4 shows a mould element in which the striations of the pattern have a pyramid-like cross section.

The extent of the patterned regions, the profiles and the positionings of the patterned regions vary according to the embodiment, the examples illustrated being provided only by way of nonlimiting illustration. Furthermore, the patterns may adopt striated shapes, as depicted for example in FIG. 3, which shows square-wave striations 19, or in FIG. 4, which shows pyramid-shaped striations 21.

Figure 5:
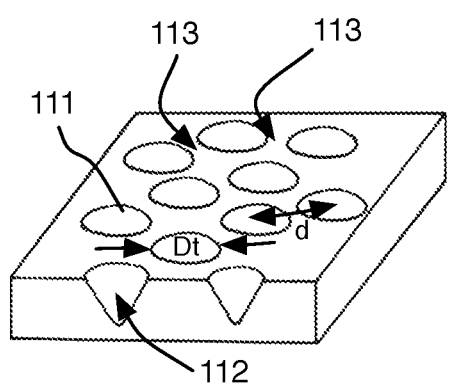
FIG. 5 depicts a pattern comprising a plurality of holes.

FIG. 5 illustrates the pattern according to a non-limiting first alternative form of the first embodiment. In this alternative form, the pattern is formed by a plurality of cavities 112. The cavities 112 here are in the shape of cones which extend into the depth of the mould and open onto the mould in the form of circular openings 111. The cavities 112 thus have a cross section which decreases into the depth of the mould. It will be noted that, in this alternative form, the openings 111 of the cavities 112 do not touch. The openings 111 are separated by intermediate regions 113.

Furthermore, the openings 111 are evenly distributed across the mould so that the distance d between each opening of the pattern is roughly similar.

Figure 6:
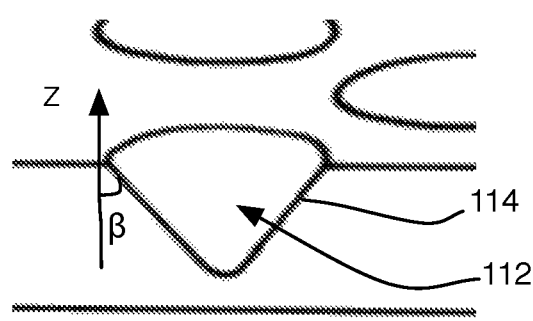
FIG. 6 is an enlarged view of the pattern of FIG. 5.

FIG. 6 is an enlarged view of the pattern of FIG. 5. All or some of the cavities here have at least one wall 114 which, when viewed in section, makes an angle β comprised between 10° and 60° with respect to a direction Z perpendicular to the pattern.

Figure 7:
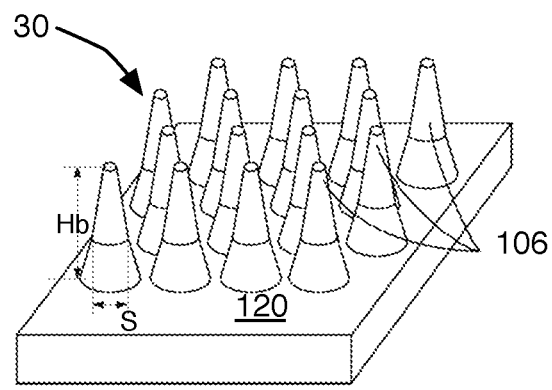
FIG. 7 shows a mould element comprising a pattern formed of strands protruding from the mould.

FIG. 7 illustrates an embodiment in which the pattern 30 comprises a plurality of strands 106, the strands 106 being distributed through the pattern with a density at least equal to one strand per $mm^2$, each strand having a mean cross section S comprised between 0.0005 $mm^2$ and 1 $mm^2$.

It will be noted that the mean cross section of each strand corresponds to the mean of the cross sections S measured at regular intervals from the base of the strand. The strands 106 have a conical overall shape with a cross section decreasing along the height Hb of these strands.

Figure 8:
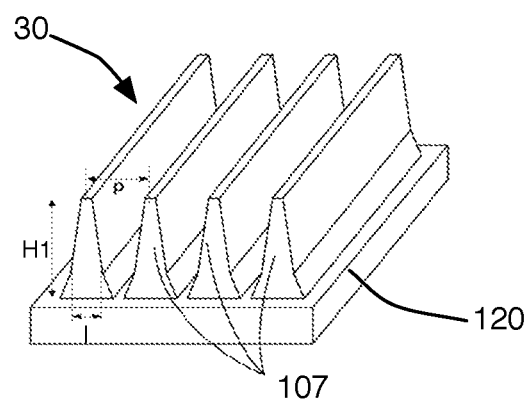
FIG. 8 shows a mould element comprising a pattern formed of strips.

FIG. 8 illustrates one embodiment in which the pattern 30 comprises a plurality of mutually parallel strips 107, the spacing of the strips 107 in the pattern 30 being at most equal to 0.5 mm, each strip 107 having a mean width comprised between 0.02 mm and 0.5 mm. It will be noted that the mean width corresponds to the mean of the widths l measured at regular intervals along the height Hl of the strip, the height of each strip being comprised between 0.05 and 0.5 mm. In another alternative form of embodiment, the pattern comprises a combination of strands 106 and/or of strips 107.

The invention is not restricted to the examples described and depicted and various modifications can be made thereto without departing from its scope. Thus, according to another nonlimiting alternative form of embodiment, the strips 107 of FIG. 8 may be discontinuous. They have a planar part between them. They may further have differences in cross section from one another. In addition, the strips may have curvatures or corners, notably along their length. They may furthermore be of variable length.

Thus, according to another nonlimiting alternative form of embodiment, the cavities 112 may have a parallelepipedal cross section of side length C comprised between 0.05 mm and 0.5 mm, of height Hp comprised between 0.05 mm and 0.5 mm, the distance between two adjacent cavities in the texture being comprised between 0.05 mm and 0.5 mm. As an alternative, the cross section of the cavities may be circular, polygonal (for example hexagonal). With square or polygonal structures it is possible to organize the openings 111 more easily in relation to one another so as to limit the surface area of the intermediate regions 113 between these openings. With such shapes of opening it is possible more easily to achieve high levels of occupancy of the openings on the mould.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

NUMERICAL REFERENCES USED IN THE FIGURES

10 Mould
12 Body
16 Support surface
18 Mould element
19 Square-wave striation
20 Bearing surface
21 Pyramid-shaped striation
22 Moulding surface
24 Network of tire tread pattern elements
26 Sipe blades
28 Circumferential bars
29 Axial sipe blades
30 Patterns
31 Bar
106 Strands
107 Strips
111 Circular opening
112 Cavity
113 Intermediate region
114 Wall

The invention claimed is:

1. A mould element adapted to be attached in a mould for vulcanizing a tire, the mould element having the form of a skin, the mould element comprising:
    a bearing surface on a first side of the mould element; and
    a moulding surface, on a second side of said mould element opposite the first side, the moulding surface being adapted to form all or part of the external surface of the said tire,
    the moulding surface comprising a pattern having a plurality of recessed or protruding elements formed as integral parts of said mould element, the pattern present on the mould making it possible to obtain a particular texture on a tire vulcanized using the mould,
    wherein the mould element comprises at least one of a bar or a sipe blade, and wherein the pattern is arranged on the at least one bar or sipe blade of the mould element, and
    wherein all or part of the pattern are substantially mutually parallel striations, the mutually parallel striations including square-wave shaped mutually parallel striations.

2. The mould element according to claim 1, wherein the depth of the recessed elements is less than or equal to 30% of the thickness of the mould element or the height of the protruding elements is less than or equal to 30% of the thickness of the mould element.

3. The mould element according to claim 1, wherein the depth of the recessed elements is less than or equal to 15% of the thickness of the mould element or the height of the protruding elements is less than or equal to 15% of the thickness of the mould element.

4. The mould element according to claim 1, wherein the spacing of the mutually parallel striations in the pattern are at most equal to 0.5 mm, each striation having a mean width comprised between 0.02 mm and 0.5 mm.

5. The mould element according to claim 1, wherein the recessed or protruding elements have mutually variable shapes and distances between them.

6. The mould element according to claim 1, configured for moulding a tire sidewall region.

7. The mould element according to claim 1, configured for moulding a region of a tire tread.

8. The mould element according to claim 1, produced by laser sintering.

9. A segmented mould for vulcanizing tires, each segment comprising a solid support block provided with a support surface and a set of linings attached to the support block, the set of linings comprising at least one mould element according to claim 1, arranged against the support surface of the support block.

10. A mould element adapted to be attached in a mould for vulcanizing a tire, the mould element having the form of a skin, the mould element comprising:
- a bearing surface on a first side of the mould element; and
- a moulding surface, on a second side of said mould element opposite the first side, the moulding surface being adapted to form all or part of the external surface of the said tire,
- the moulding surface comprising a pattern having a plurality of recessed or protruding elements formed as integral parts of said mould element, the pattern present on the mould making it possible to obtain a particular texture on a tire vulcanized using the mould,
- wherein the mould element comprises at least one of a bar or a sipe blade, and wherein the pattern is arranged on the at least one bar or sipe blade of the mould element, and
- wherein all or part of the pattern are substantially mutually parallel striations, the mutually parallel striations including pyramid-shaped mutually parallel striations.

* * * * *